UNITED STATES PATENT OFFICE.

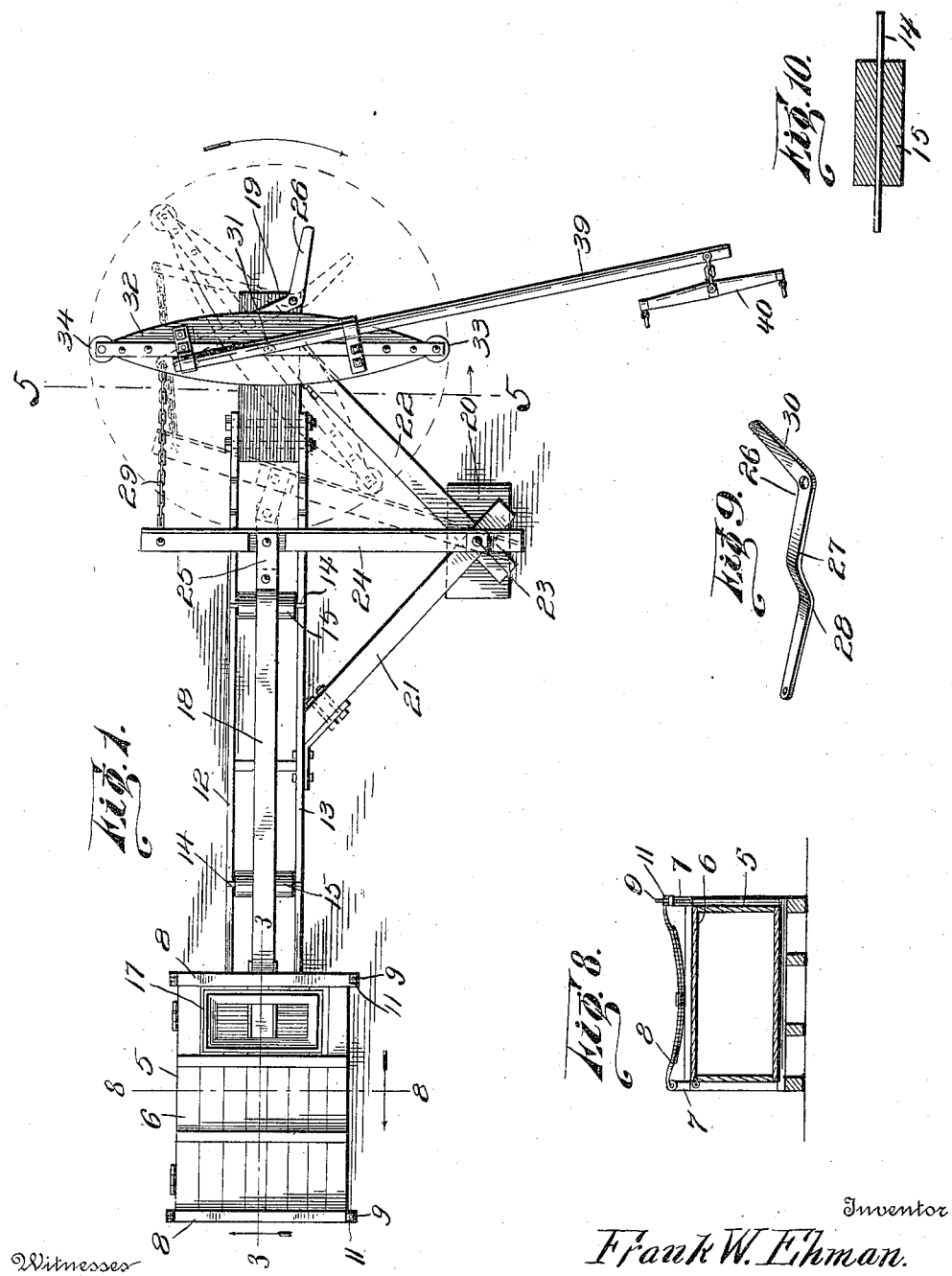

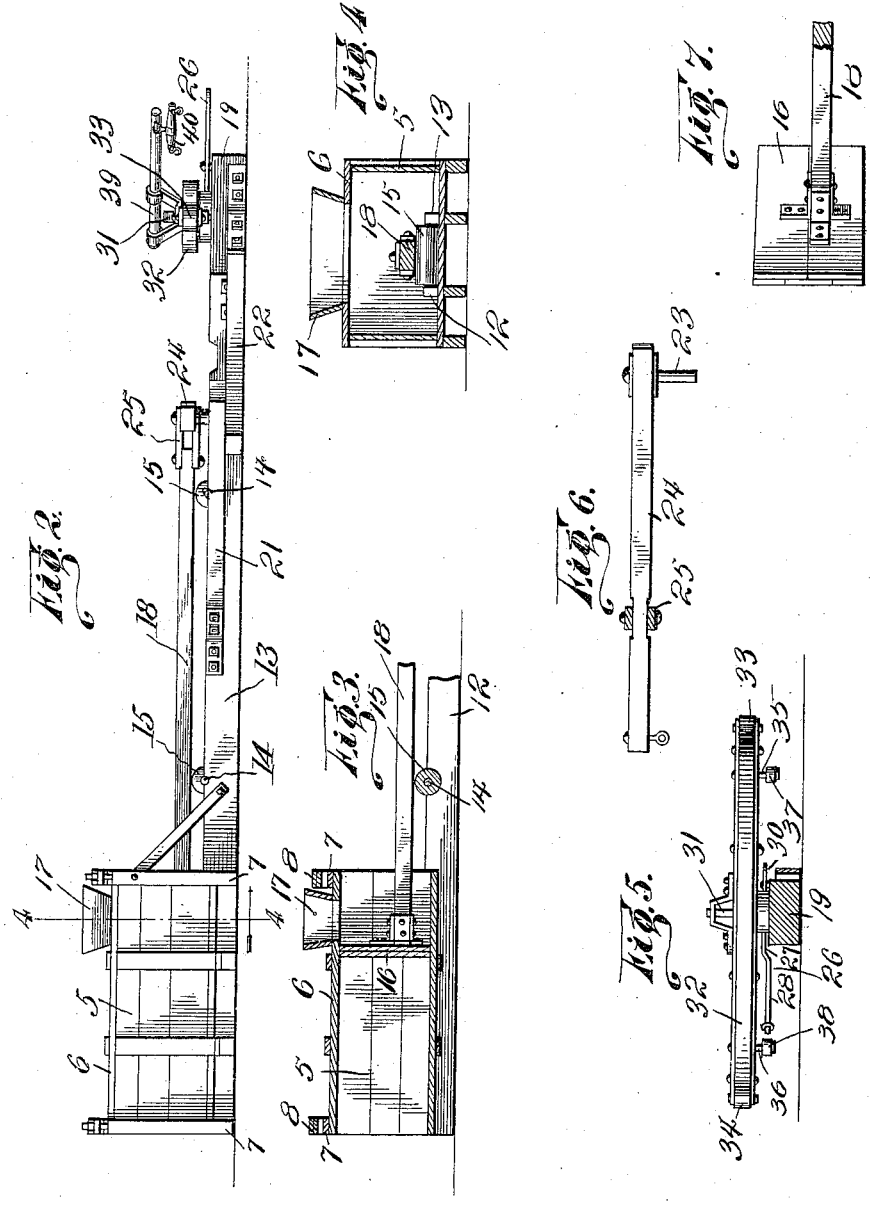

FRANK WILLIAM EHMAN, OF SILVER CREEK, MISSISSIPPI.

HAY-PRESS.

981,626.　　　　　　　Specification of Letters Patent.　　Patented Jan. 17, 1911.

Application filed December 28, 1909. Serial No. 535,296.

*To all whom it may concern:*

Be it known that I, FRANK WILLIAM EHMAN, a citizen of the United States, residing at Silver Creek, in the county of Lawrence and State of Mississippi, have invented new and useful Improvements in Hay-Presses, of which the following is a specification.

This invention relates to improvements in hay presses and has for its object the provision of a device of that kind provided with a compression box or cylinder and a plunger adapted to be reciprocated in said cylinder and a rotatable beam operated by a draft animal and adapted at each half revolution to reciprocate the plunger.

With the above and other objects in view, as will more fully hereinafter appear the present invention consists of certain novel details of construction and arrangement of parts hereinafter to be more fully described, illustrated in the accompanying drawings and more particularly pointed out in the appended claims, it being understood that various changes in the form, proportion, size and minor details of the device may be made within the scope of the appended claims, without departing from the spirit or sacrificing any of the advantages of the invention.

In the accompanying drawings forming a part of the specification, Figure 1 is a plan view of the device. Fig. 2 is a side elevation thereof. Fig. 3 is a sectional view on the line 3—3 of Fig. 1. Fig. 4 is a transverse sectional view on the line 4—4 of Fig. 2. Fig. 5 is a side elevation of the operating beam on the line 5—5 of Fig. 1. Fig. 6 is a detail side elevation of the oscillating lever. Fig. 7 is a detail perspective view of the plunger and a fragment of the plunger rod. Fig. 8 is a transverse sectional view on the line 8—8 of Fig. 1. Fig. 9 is a detail perspective view of the operating arm and, Fig. 10 is a longitudinal section of one of the rollers.

Similar numerals of reference are employed to designate corresponding parts throughout.

The device consists essentially in a baling chamber designated by the numeral 5. This member is oblong in contour and open at its forward end. Hingedly united to the chamber is a cover 6 and rising from the opposite end portions of the side walls of the casing are four standards 7. Pivoted to the standards on one side of the casing are the end portions of a pair of bow-shaped springs 8, the free ends of which are provided with openings to receive threaded studs 9 projecting from the upper ends of the standards on the opposite sides of the casing, these threaded studs receiving suitable nuts 11 which secure the free ends of the spring against displacement.

By reference to Fig. 8 it will be seen that the medial portions of the springs bear on the top or cover 6 and when so bearing will prevent upward movement of the cover. Extending forwardly from the open end of the casing is a track, the rails of which are designated by the numerals 12 and 13. These rails may be of any convenient length, and journaled in the rails are shafts 14 upon which are arranged rollers 15, a portion of the peripheries of which extend above the upper edges of the rails 12 and 13. Slidingly fitted in the baling chamber 5 is a plunger 16. This member may be of any suitable material and of a size to nicely fit within the baling chamber. It might here be stated the top or cover 6 is somewhat less in length than the length of the casing and that portion of the upper side of the casing not covered by the top 6 is provided with a hopper 17 through which the hay to be pressed is directed into the casing. Fixedly secured to that face of the plunger adjacent the open end of the casing is a plunger rod 18, somewhat less in length than the length of the track. This member is so positioned that during its outward and inward movements it will bear on the rollers 15.

By reference now to Fig. 1 it will be seen that positioned between the forward ends of the rails 12 and 13 is a block 19 which extends considerably in advance of the forward ends of said rails, and located at a point intermediate the middle and free ends of the rail 13 and spaced therefrom is a block 20. Connection between the block 19 and the block 20 and the rail 13 is established by means of a pair of obliquely disposed struts 21 and 22, the opposite ends of which are fixedly secured to the blocks 19 and 20 and rail 13. Rising from the central portion of the block 20 and extending through the outer ends of the struts 21 and 22 is a pivot pin 23 and loosely mounted on the pivot pin 23 is one end of a lever 24. It might here be stated when the lever 24 is perpendicular to the rail 13 its free end will extend considerably in advance of the outer face of the opposite rail 12, and when the lever is in this position and the plunger rod moved outwardly to its full extent the free end of said plunger rod will extend to a point adjacent the lever, as clearly shown by full lines in Fig. 1. Connection between the free end of the plunger rod and lever is established by means of a link 25, the opposite ends of which are pivoted to the lever and free end of the rod 18. With this construction it is evident that when the lever is oscillated, in a manner to be presently described, by virtue of the link 25 the plunger and plunger rod will be reciprocated.

In order to bring about the reciprocation of the plunger and plunger rod the following construction is employed:—By reference now to Fig. 1 it will be seen that pivoted to one corner of the block 19 is an arm 26. This arm 26 in contour closely resembles a bell crank lever having arms of unequal length. The arm 26 is arranged on the upper face of the block 19 and its longer side 27 is considerably greater in length than the width of the block 19. At a point adjacent the free end of the longer side 27 the said side is provided with a downwardly directed offset 28, whereby the said free end of the longer side will be arranged below the plane of the upper side of the block 19. The extremity of the longer side 27, when the said side is perpendicular to the length of the block 19, will be in a plane with the free end of the lever 24, or substantially so, and connection between the said free end of the longer side 27 and free end of the lever 24 is established by means of a chain or other flexible element 29. The shorter side 30 of the arm 26 extends in advance of the free end of the block 19, when the longer side 27 is perpendicular to the length of the block as before described. Rising from the center of the block 19 is a short shaft 31 and rotatably mounted on this shaft is a beam 32. The beam 32 is considerably greater in length than the longer side 27 of the arm 26 and when the lever 24 is perpendicular to the rails 12 and 13 and the beam parallel with the block 19, one end of the beam will bear on the adjacent side of the lever 24. The opposite ends of the beam 32 are provided with rollers 33 and 34 adapted to bear alternately on the lever 24. Depending from the lower face of the beam 32 and located adjacent the opposite ends thereof are a pair of pins 35 and 36 upon which are journaled rollers 37 and 38 as clearly shown in Fig. 5. The rollers 37 and 38 during the rotation of the beam will move into the plane of the short side 30 of the arm 26. Fixedly secured to the beam 32 is a draft pole 39, the outer end of which is provided with a swingletree 40 to which the draft animal is hitched.

Having now described the construction of the device its operation will be given:—Assuming that the parts are in the positions shown in Fig. 1 and a draft animal is hitched to the swingletree 40 and directed to move in a circle indicated by the arrow in Fig. 1, it will be obvious, as the beam 32 is rotated, the rollers 33 will first bear on the adjacent side of the lever 24. After the roller is moved from engagement with the lever the roller 37 depending from the lower face of the beam will engage with the short side 30 of the arm 26 and as the beam rotates, this side of the arm will be moved rearwardly while its opposite side will be moved forwardly, whereby the plunger, through the chain 29, lever 24 and plunger rod 18 will be drawn outwardly from the baling chamber. Owing to the fact that the end of the beam 32 moves in the arc of a circle eccentric with the arc in which the short side 30 of the arm 26 moves, it will be evident when the arm is moved in the position shown by dotted lines in Fig. 1, that the roller 37 will move from engagement with said arm, whereby the plunger will remain in its retracted position. As the beam continues to rotate the roller 33 will move into engagement with the lever 24, whereby the latter will be forced toward the baling chamber or casing 5 moving with it the plunger rod 18 and arm 26, so that the hay within the casing or baling chamber will be compressed and at the same time the arm 26 positioned to be engaged by the roller 38 at the opposite end of the beam.

With this construction it is evident that at each half revolution of the beam, the plunger will be reciprocated and it is evident that the operation of pressing the hay will be greatly facilitated and the time ordinarily required to form a bale reduced to a minimum.

From the foregoing it is evident that I have provided a device which is exceedingly simple in construction and comparatively inexpensive of manufacture, embodying few parts and these so arranged that the danger of derangement will be reduced to a minimum.

Having thus fully described the invention, what is claimed as new is:—

In a hay press, a reciprocating plunger, an oscillating lever having one end connected with the plunger, a rotatable beam having rollers at its opposite ends to alternately engage with one side of the lever and move the latter in one direction, an oscillating arm pivoted at its intermediate portion below the beam and movable in an arc eccentric with the circle in which the beam moves, a flexible connection between the arm and lever and means depending from the opposite end portions of the beam and adapted to alternately engage with the free end of the arm and move the connected end of the latter for a certain distance in the same direction as the movement of the beam, whereby the plunger is moved in a direction opposite to the movement imparted to it directly by the beam.

In testimony whereof I affix my signature in presence of two witnesses.

FRANK WILLIAM EHMAN.

Witnesses:
MYRTLE FREEMAN,
R. D. MUNN.